United States Patent
Huang et al.

(10) Patent No.: US 10,666,976 B2
(45) Date of Patent: May 26, 2020

(54) METHOD AND APPARATUS OF VIDEO CODING

(71) Applicant: MediaTek Singapore Pte. Ltd., Singapore (SG)

(72) Inventors: Han Huang, Beijing (CN); Kai Zhang, Beijing (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 227 days.

(21) Appl. No.: 15/479,974

(22) Filed: Apr. 5, 2017

(65) Prior Publication Data

US 2017/0295380 A1    Oct. 12, 2017

(30) Foreign Application Priority Data

Apr. 6, 2016   (WO) ................ PCT/CN2016/078517

(51) Int. Cl.
*H04N 11/02*   (2006.01)
*H04N 19/60*   (2014.01)
(Continued)

(52) U.S. Cl.
CPC ........... *H04N 19/60* (2014.11); *H04N 19/119* (2014.11); *H04N 19/12* (2014.11); *H04N 19/46* (2014.11);
(Continued)

(58) Field of Classification Search
CPC .... H04N 19/119; H04N 19/12; H04N 19/172; H04N 19/174; H04N 19/176;
(Continued)

(56) References Cited

U.S. PATENT DOCUMENTS 9,264,713 B2   2/2016   Joshi et al.
9,648,318 B2   5/2017   Chen et al.
(Continued)

FOREIGN PATENT DOCUMENTS

CN   103636205 A   3/2014
CN   104471935 A   3/2015
CN   104769948 A   7/2015

OTHER PUBLICATIONS

International Search Report and Written Opinion dated Jul. 10, 2017 in PCT/ CN2017/079537.

*Primary Examiner* — Leron Beck
(74) *Attorney, Agent, or Firm* — Oblon, McClelland, Maier & Neustadt, L.L.P.

(57) ABSTRACT

Aspects of the disclosure include a video encoding device that includes a processing circuit configured to receive a first block corresponding to a first color space component and a second block corresponding to a second color space component. The processing circuit is configured to determine transform settings for processing a first transformed block and a second transformed block corresponding to the first and second blocks, respectively. The processing circuit is configured to generate a first syntax element set to be signaled in association with the first color space component, and to generate a second syntax element set to be signaled in association with the second color space component, where the first syntax element set indicates a first transform setting for processing the first transformed block, and the second syntax element set indicates a second transform setting for processing the second transformed block.

18 Claims, 8 Drawing Sheets

(51) Int. Cl.
*H04N 19/12* (2014.01)
*H04N 19/119* (2014.01)
*H04N 19/46* (2014.01)
*H04N 19/70* (2014.01)
*H04N 19/172* (2014.01)
*H04N 19/174* (2014.01)
*H04N 19/176* (2014.01)
*H04N 19/184* (2014.01)
*H04N 19/186* (2014.01)
*H04N 19/96* (2014.01)

(52) U.S. Cl.
CPC .......... *H04N 19/70* (2014.11); *H04N 19/172* (2014.11); *H04N 19/174* (2014.11); *H04N 19/176* (2014.11); *H04N 19/184* (2014.11); *H04N 19/186* (2014.11); *H04N 19/96* (2014.11)

(58) Field of Classification Search
CPC .... H04N 19/184; H04N 19/186; H04N 19/46; H04N 19/60; H04N 19/70; H04N 19/96
USPC .................................... 375/240.18
See application file for complete search history.

(56) References Cited

U.S. PATENT DOCUMENTS

| | | | |
|---|---|---|---|
| 2010/0322512 A1* | 12/2010 | Huang | H04N 19/186 382/166 |
| 2013/0003856 A1* | 1/2013 | Saxena | H04N 19/159 375/240.18 |
| 2013/0177241 A1 | 7/2013 | Huang | |
| 2014/0016698 A1* | 1/2014 | Joshi | H04N 19/88 375/240.12 |
| 2014/0105299 A1* | 4/2014 | Chen | H04N 19/597 375/240.15 |
| 2014/0254661 A1* | 9/2014 | Saxena | H04N 19/625 375/240.2 |
| 2014/0376611 A1* | 12/2014 | Kim | H04N 19/176 375/240.02 |
| 2015/0264364 A1* | 9/2015 | Zhang | H04N 19/126 375/240.18 |
| 2015/0358631 A1* | 12/2015 | Zhang | H04N 19/44 375/240.16 |
| 2016/0100168 A1* | 4/2016 | Rapaka | H04N 19/124 375/240.03 |

* cited by examiner

METHOD AND APPARATUS OF VIDEO CODING

INCORPORATION BY REFERENCE

This present disclosure claims the benefit of PCT application No. PCT/CN2016/078517, "SEPARATE CODING SECONDARY TRANSFORM SYNTAX ELEMENTS FOR DIFFERENT COLOR COMPONENTS" filed on Apr. 6, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards divide an image frame of an input video into one or more coding tree units (CTUs), and each CTU includes coding tree blocks (CTBs) that correspond to various color space components of a predetermined color space, respectively. In some applications, the predetermined color space may include an RGB color space having a red component (R), a green component (G), and a blue component (B); an YCbCr color space having a luma component (Y), a blue-difference chroma component (Cb), and a red-difference chroma component (Cr); a YCoCg color space having a luma component (Y), an orange chroma component (Co), and a green chroma component (Cg); or the like.

Moreover, each CTB may be divided into one or more coding blocks (CBs), and each CB may include one or more prediction blocks (PBs) and one or more transform blocks (TBs). When encoding an original image of a CB, the original image of the CB can be divided into a predictable portion to be encoded using the PBs and a residual portion (i.e., prediction errors) to be encoded using the TBs according to a predetermined video coding standard. When decoding the CB, a reconstructed image of the CB can be obtained by generating and combining the predictable portion and the residual portion of the CB according to the same predetermined video coding standard.

SUMMARY

Aspects of the disclosure provide a video encoding device that includes a processing circuit configured to receive an image frame associated with a first block and a second block, where the first block corresponds to a first color space component and the second block corresponds to a second color space component. The processing circuit is configured to apply a transform process to a first residual portion of the first block and a second residual portion of the second block to generate a first transformed block and a second transformed block, respectively, and to determine transform settings for processing the first transformed block and the second transformed block. The processing circuit is configured to generate a first syntax element set to be signaled in association with the first color space component, and to generate a second syntax element set to be signaled in association with the second color space component, where the first syntax element set indicates a first transform setting for processing the first transformed block, and the second syntax element set indicates a second transform setting for processing the second transformed block. The processing circuit is further configured to generate encoded video data for output to include the first syntax element set or the second syntax element set.

In an embodiment, the determined transform settings include information indicating whether to process the first transformed block or the second transformed block using a secondary transform process. The determined first transform setting includes information indicating first candidate transform matrices, or a selected first transform matrix, for the secondary transform process used to process the first transformed block. The determined second transform setting includes information indicating second candidate transform matrices, or a selected second transform matrix, for the secondary transform process used to process the second transformed block.

In an embodiment, the processing circuit is further configured to determine whether the second transform setting is to be signaled in association with the first color space component or the second color space component. When the second transform setting is determined to be signaled in association with the second color space component, the processing circuit may determine the second transform setting and generate the second syntax element set to be signaled in association with the second color space component. When the second transform setting is determined to be signaled in association with the first color space component, the processing circuit may use the first transform setting as the second transform setting, without generating the second syntax element set.

The processing circuit may be further configured to include a flag in the encoded video data. The flag can indicate whether the second transform setting is to be signaled in association with the first color space component or the second color space component.

The processing circuit may be configured to determine whether the second transform setting is to be signaled in association with the first color space component or the second color space component based on block partitioning structures corresponding to the first color space component and the second color space component.

In addition, the first color space component may correspond to a luma component, and the second color space component may correspond to a chroma component. Also, the first color space component may correspond to a first chroma component, and the second color space component may correspond to a second chroma component.

Aspects of the disclosure can provide a video encoding method that includes receiving an image frame associated with a first block and a second block, where the first block corresponds to a first color space component and the second block corresponds to a second color space component. The method may include applying a transform process to a first residual portion of the first block and a second residual portion of the second block to generate a first transformed block and a second transformed block, respectively, determining transform settings for processing the first transformed block and the second transformed block, generating a first syntax element set to be signaled in association with the first color space component, and generating a second syntax element set to be signaled in association with the second color space component. The first syntax element set may indicate a first transform setting for processing the first transformed block, and the second syntax element set may indicate a second transform setting for processing the second transformed block. The method may further includes generating encoded video data for output to include the first syntax element set or the second syntax element set.

Aspects of the disclosure can further provide a video decoding device that includes a processing circuit configured to receive encoded video data associated with a first block and a second block, where the first block corresponds to a first color space component and the second block corresponds to a second color space component. The processing circuit may be configured to identify transform settings for processing a first residual portion of the first block and a second residual portion of the second block. Identifying the transform settings may include identifying a first transform setting for reconstructing the first residual portion of the first block based on a first syntax element set signaled in association with the first color space component, and identifying a second transform setting for reconstructing the second residual portion of the second block based on a second syntax element set signaled in association with the second color space component. the processing circuit may be configured to generate a first transformed block based on the identified first transform setting, to generate a second transformed block based on the identified second transform setting, and to apply an inverse transform process to the first transformed block and the second transformed block to generate the first residual portion and the second residual portion for output, respectively.

In an embodiment, the identified transform settings include information indicating whether to generate the first transformed block or the second transformed block using a secondary inverse transform process. The identified first transform setting includes information indicating first candidate transform matrices, or a selected first transform matrix, for the secondary inverse transform process used to generate the first transformed block. The identified second transform setting includes information indicating second candidate transform matrices, or a selected second transform matrix, for the secondary inverse transform process used to generate the second transformed block.

The processing circuit may be further configured to determine whether the second transform setting is to be signaled in association with the first color space component or the second color space component. When the second transform setting is determined to be signaled in association with the second color space component, the processing circuit may identify the second transform setting based on the second syntax element set. When the second transform setting is determined to be signaled in association with the first color space component, the processing circuit may use the first transform setting as the second transform setting, without identifying the second transform setting based on the second syntax element set.

In addition, the processing circuit may be configured to extract a flag from the encoded video data. The flag may indicate whether the second transform setting is to be signaled in association with the first color space component or the second color space component.

Aspects of the disclosure further provide a video decoding method that includes receiving encoded video data associated with a first block and a second block, where the first block corresponds to a first color space component and the second block corresponds to a second color space component. The method may include identifying transform settings for processing a first residual portion of the first block and a second residual portion of the second block. Identifying the transform settings may include identifying a first transform setting for reconstructing the first residual portion of the first block based on a first syntax element set signaled in association with the first color space component, and identifying a second transform setting for reconstructing the second residual portion of the second block based on a second syntax element set signaled in association with the second color space component. The method may further include generating a first transformed block based on the identified first transform setting, generating a second transformed block based on the identified second transform setting, and applying an inverse transform process to the first transformed block and the second transformed block to generate the first residual portion and the second residual portion, respectively.

Aspects of the disclosure further provide a non-transitory computer-readable medium storing a bitstream. The bitstream includes data in a compressed format corresponding to a first block and a second block of an image frame, where the first block corresponds to a first color space component and the second block corresponds to a second color space component. The data in the compressed format for the first block and the second block may include a first syntax element set indicating a first transform setting for reconstructing a first residual portion of the first block, and a second syntax element set indicating a second transform setting for reconstructing a second residual portion of the second block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
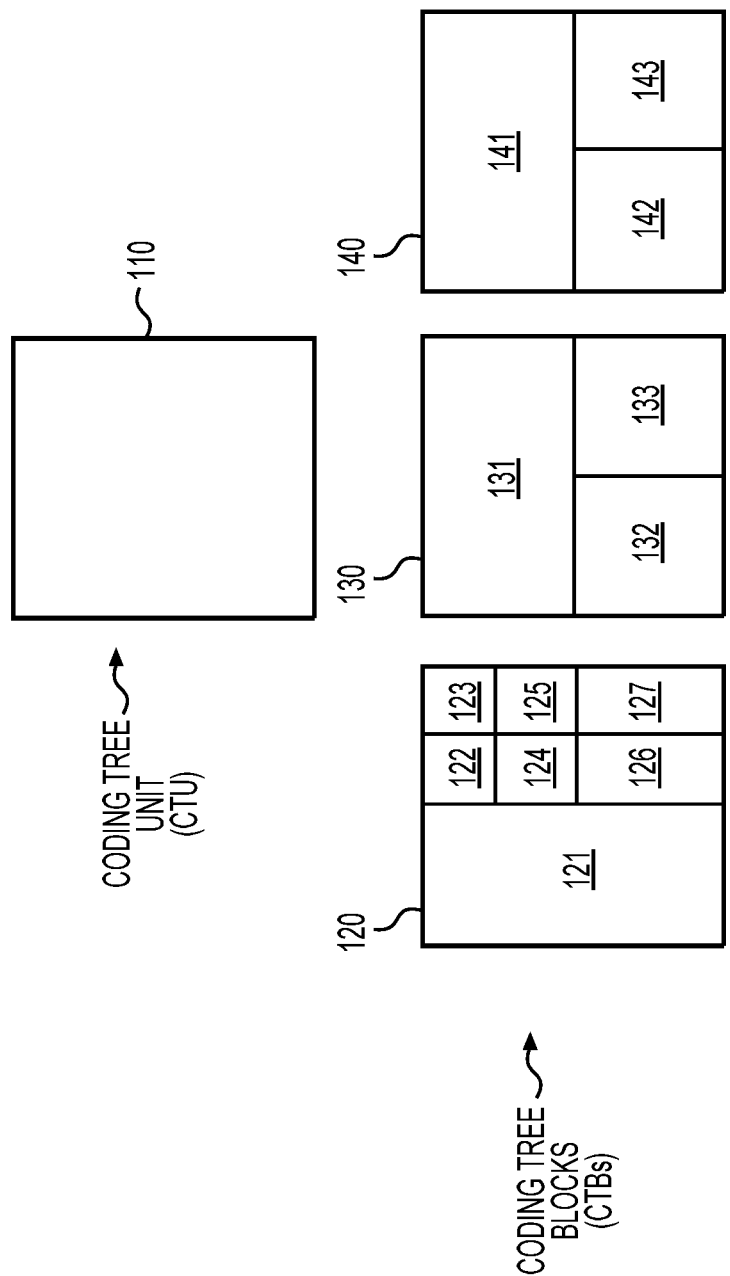
FIG. 1 shows a diagram illustrating a coding tree unit (CTU) and corresponding coding tree blocks (CTBs) according to an exemplary embodiment of the disclosure.

FIG. 1 shows a diagram illustrating a coding tree unit (CTU) 110 and corresponding coding tree blocks (CTBs)

120, 130, and 140 according to an exemplary embodiment of the disclosure. The CTU 110 may include an image block of an image frame that can be represented by plural color space components of a predetermined color space. The predetermined color space may be an RBG, YUV, YCbCr, or YCoCg color space, or the like. For example, the image block of the CTU 110 may be represented using an YCbCr color space, which may include a luma component (Y), a blue-difference chroma component (Cb), and a red-difference chroma component (Cr). Accordingly, the CTU 110 may be divided into three CTBs 120, 130, and 140, where each CTB corresponds to a respective one of the color space components. For example, CTB 120 may correspond to the luma component, CTB 130 may correspond to the blue-difference chroma component, and CTB 140 may correspond to the red-difference chroma component.

Each CTB 120, 130, and 140 may be further divided into coding blocks. For example, CTB 120 may include coding blocks 121-127; CTB 130 may include coding blocks 131-133; and CTB 140 may include coding blocks 141-143. Each coding block may include a prediction portion that can be further divided into one or more predictors and a residual portion that can be further divided one or more residual blocks. Also, depending on the chosen color format, the number of pixels in the CTB 120 may be different from the numbers of pixels in the CTB 130 or 140. The block partitions of the CTB 120, CTB 130, and CTB 140 may be implemented using a quadtree partitioning structure or a quadtree plus binary tree (QTBT) partitioning structure. In some examples using the QTBT partitioning structure, each coding block may correspond to a prediction portion and a residual portion without any further partitioning.

In the present disclosure, two coding blocks are collocated blocks when these two blocks correspond to at least one common pixel in the original image block. A collocated block in another CTB for a current block of a current CTB can be identified by using a predetermined pixel of the current block as the common pixel. In some examples, the predetermined pixel of the current block can be the upper left corner pixel, a center pixel, any predetermined corner pixel, or the like.

Because the CTB 120 and the CTBs 130 and 140 may have different block partitions (i.e., the block partitioning structures are different), the transform settings for encoding/decoding a block in CTB 120 may not be the best transform settings for its collocated block in CTB 130 or 140. Also, although the CTBs 130 and 140 may have the same block partition, because the CTBs 130 and 140 indeed correspond to different color space components, the transform settings for encoding/decoding a block in the CTB 130 still may not be the best transform settings for its collocated block in the CTB 140. Therefore, in some examples, the transform settings are the same for all collocated blocks and thus can be coded using a syntax element set signaled in association with one representative color space component for all color space components. Also, in some examples, the transform settings for two collocated blocks may be individually determined and thus can be coded using syntax element sets signaled in association with respective color space components.

In some examples, the syntax elements for encoding/decoding the residual portions may be signaled in association with the luma component as the representative color space component for all color space components. Accordingly, a syntax element set for encoding/decoding the residual portions of the blocks 121-127 in the CTB 120 may be determined and signaled on a block-by-block basis. However, when encoding or decoding the residual portion of a block 131-133 in the CTB 130 or the residual portion of a block 141-143 in the CTB 140, the transform settings for the corresponding collocated block in the CTB 120 can be used without additional syntax elements signaled for the CTB 130 and the CTB 140.

In some examples, the syntax elements for encoding/decoding the residual portions may be signaled in association with the luma component as the representative color space component for a subset including only the luma component, and in association with the blue-difference chroma component as the representative color space component for a subset including the blue-difference chroma component and the red-difference chroma component. Accordingly, a syntax element set for encoding/decoding the residual portion of a block 121-127 in the CTB 120 may be determined and signaled on a block-by-block basis. Also, a syntax element set for encoding/decoding the residual portion of a block 131-133 in the CTB 130 may be determined and signaled on a block-by-block basis. When encoding or decoding the residual portion of a block 141-143 in the CTB 140, the transform settings for the corresponding collocated block in the CTB 130 are used without additional syntax elements signaled for the CTB 140.

In yet some examples, the syntax elements for encoding/decoding the residual portions may be signaled in association with the luma component as the representative color space component for a subset including only the luma component, in association with the blue-difference chroma component as the representative color space component for a subset including only the blue-difference chroma component, and in association with the red-difference chroma component as the representative color space component for a subset including only the red-difference chroma component. Accordingly, a syntax element set for encoding/decoding the residual portion of a block 121-127 in the CTB 120 may be determined and signaled on a block-by-block basis. A syntax element set for encoding/decoding the residual portion of a block 131-133 in the CTB 130 may be determined and signaled on a block-by-block basis. Also, a syntax element set for encoding/decoding the residual portion of a block 141-143 in the CTB 140 may be determined and signaled on a block-by-block basis.

Figure 2:
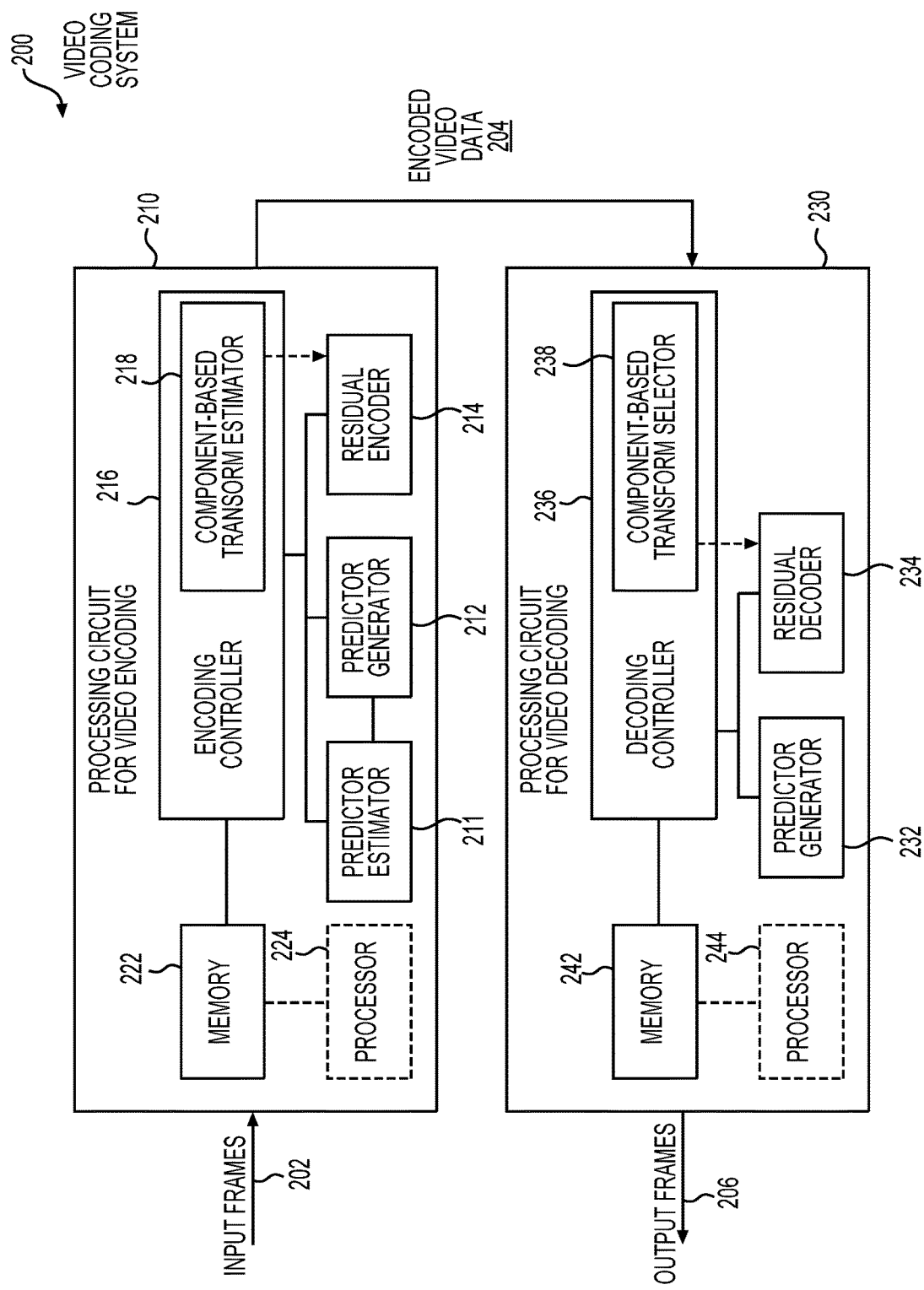
FIG. 2 shows an exemplary functional block diagram of a video coding system according to an embodiment of the disclosure.

FIG. 2 shows an exemplary functional block diagram of a video coding system 200 according to an embodiment of the disclosure. The video coding system 200 includes a processing circuit for video encoding (i.e., an encoding circuit) 210 and a processing circuit for video decoding (i.e., a decoding circuit) 230. The encoding circuit 210 receives input image frames 202 as input data and generates encoded video data 204 by encoding the input image frames 202. The encoded video data 204 can be, for example, in a bitstream that includes data in a compressed format and can be stored in a non-transitory computer-readable medium. The decoding circuit 230 receives the encoded video data 204 as input data and generates output image frames 206 by decoding the encoded video data 204. The video coding system 200 may be implemented by one or more video coding devices that can include the encoding circuit 210, the decoding circuit 230, or both the encoding circuit 210 and decoding circuit 230.

Each input image frame 202 may be divided into coding blocks based on a predetermined block partitioning structure and a predetermined color space that has plural color space components. Each block may correspond to one of the color space components of the predetermined color space. For example, when the input image frame uses the YCbCr color space, a block to be encoded (or a current block) in the image frame may correspond to one of the luma component (Y), the blue-difference chroma components (Cb), or the red-difference chroma components (Cr) of the YCbCr color space.

The encoding circuit 210 can include at least a predictor estimator 211, a predictor generator 212, a residual encoder 214, and an encoding controller 216. The predictor estimator 211 can analyze the input image frames 202 and determine prediction information for encoding the current block. The prediction information may specify a type of prediction, such as whether the current block is to be encoded using intra prediction, inter prediction, or other applicable prediction mechanisms. The prediction information may also include prediction parameters for generating a prediction portion of the current block using the specified prediction mechanism. The predictor generator 212 can generate the prediction portion of the current block based on the prediction information provided by the predictor estimator 211. A residual portion of the current block can be generated based on a difference between the prediction portion and a corresponding original image of the current block.

The residual encoder 214 can receive the residual portion and encode the residual block into encoded residual data. The encoding controller 216 can oversee the encoding of the input image frames 202, including receiving the prediction information from the predictor estimator 211, receiving the encoded residual data from the residue encoder 214, generating the encoded video data 204 based on the prediction information, the encoded residual data, and other encoding information, and/or controlling the operation of the predictor estimator 211, the predictor generator 212, and the residual encoder 214.

For encoding a residual portion of the current block, the encoding controller may divide the residual portion into one or more residual blocks. The residue encoder 214 may receive a residual block, generate an output transformed block by performing a core transform and optionally a secondary transform on the residual block, generate a quantized block by performing a quantization process on the output transformed block, and generate the coded residual data by entropy encoding the quantized block. The core transform may transform the residual block into a core transformed block, which is a frequency domain representation of the residual block. In some examples, when the secondary transform is bypassed, the core transformed block is used as the output transformed block. The secondary transform may transform the core transformed block into a secondary transformed block, where the coefficients of the core transformed block may be adjusted in order to reduce the complexity of the quantized block. When the secondary transform is applied, the secondary transformed block is used as the output transformed block.

The encoding controller 216 may further include a component-based transform estimator 218. The component-based transform estimator 218 can determine transform settings with respect to the core transform or the secondary transform to be performed by the residual encoder 214, and/or whether to apply the secondary transform by the residual encoder 214. In some examples, the color space components can be grouped into at least two subsets of the color space components, and the syntax elements indicating a portion or the entirety of the transform settings may be signaled in association with at least two representative color space components for the at least two subsets, respectively. Accordingly, for example, the encoding circuit 210 may receive a first block corresponding to the first color space component and a second block corresponding to a second color space component, where the transform settings for the first block may be individually determined and encoded using a first syntax set to be signaled in association with the first color space component, and the transform settings for the second block may be individually determined and encoded using a second syntax set to be signaled in association with the second color space component.

In some examples, the syntax elements indicating the transform settings may be all signaled in association with only one representative color space component for all the color space components. Whether to signal the syntax elements indicating the transform settings in association with one color space component for all colors space components or in association with at least two color space components for respective subsets of the color space components may be signaled or derived at the coding block level.

In operation, the encoding controller 216 may receive the input frames 202, including the current block to be encoded by the encoding circuit 210. The encoding controller 216 works with the predictor estimator 211 to determine a prediction type and corresponding prediction parameters for encoding the current block. The predictor estimator 211 may forward the determined prediction type and corresponding prediction parameters to the encoding controller 216 and the predictor generator 212. The predictor generator 212 can generate the portion of the current block based on the determined prediction type and corresponding prediction parameters. A residual portion of the current block may be generated based on the difference between the prediction portion and an original image of the current block. The component-based transform estimator 218 may work with the residual encoder 214 to determine transform settings for the current block. The residual encoder 214 can encode the residual portion according to the transform settings and output encoded residual data to the encoding controller 216. Finally, the encoding controller 216 can generate the encoded video data 204 based on the prediction type, the prediction parameters, the transform settings, the encoded residual data, and related control information.

The component-based transform estimator 218 can determine whether the transform settings are to be signaled in association with one representative color space component for all the color space components, or in association with at least two representative color space components for respective subsets of the color space components. In some examples, the component-based transform estimator 218 may determine that the transform settings for two color space components are to be signaled in association with one representative color space component when the block partitioning structures corresponding to the two color space components are the same. Also, the component-based transform estimator 218 may determine that the transform settings for two color space components are to be signaled in association with individual color components when the block partitioning structures corresponding to the two color space components are the different.

In some examples, the component-based transform estimator 218 may determine that the transform settings for different color space components are to be signaled in association with different respective representative color space components based on a predetermined grouping of the color space components. For example, regardless of the block partitioning structures corresponding to a luma component and a chroma component being the same or different, the luma and chroma components may use separated transform syntax element sets. Also, in some examples, regardless of the block partitioning structures corresponding to a first chroma component and a second chroma component being the same or different, the first and second chroma components may use separated transform syntax element sets.

Moreover, the transform settings for performing the core transform and the secondary transform may be signaled based on different grouping of the color space components. For example, when the syntax elements for performing the secondary transform are to be signaled in association with at least two representative color space components for respective subsets of the color space components, the syntax elements for performing the core transform may be determined and signaled in association with only one representative color space components for all color space components.

Also, the encoding controller 216 can embedded, explicitly using a dedicated flag or implicitly without using the dedicated flag, information with respect to whether the syntax elements indicating transform settings are to be signaled in association with one representative color space component for all the color space components, or in association with at least two representative color space components for respective subsets of the color space components. In some examples, the encoding controller 216 can include the flag using a video level, picture level, slice level, tile level, or sequence level syntax element.

When the syntax elements are to be signaled in association with one representative color space component for all the color space components, the component-based transform estimator 218 may work with the residual encoder 214 to identify a transform setting for the current block when the current block corresponds to the representative color space component and encode the transform setting using a syntax element set to be signaled in association with the representative color space component. The component-based transform estimator 218 may use the transform setting for a collocated block that corresponds to the representative color space component as the transform setting for encoding the current block when the current block does not correspond to the representative color space component.

When the syntax elements are to be signaled in association with at least two representative color space components for respective subsets of the color space components, the component-based transform estimator 218 may work with the residual encoder 214 to identify a transform setting for the current block when the current block corresponds to the representative color space component for the subset of the color space components the current block belongs and encode the transform setting in a syntax element set to be signaled in association with the representative color space component. The component-based transform estimator 218 may use the transform setting for a collocated block that corresponds to the corresponding representative color space component for the subset of the color space components the current block belongs when the current block does not correspond to any of the representative color space components.

The encoding circuit 210 may further include a memory 222 and a processor 224. The memory 222 can be used to store program instructions, information corresponding to the prediction modes, prediction parameters, input image frames, generated predictors, residual blocks, and/or intermediate data for performing various functions of the encoding circuit 210. In some examples, the memory 222 includes a non-transitory computer readable medium, such as a semiconductor or solid-state memory, a random access memory (RAM), a read-only memory (ROM), a hard disk, an optical disk, or other suitable storage medium. In some embodiments, the memory 222 includes a combination of two or more of the non-transitory computer readable mediums listed above.

The processor 224 is electrically coupled with the memory 222 and can be configured to execute the program instructions stored in the memory 222 to perform various functions. The processor 224 can include a single or multiple processing cores. Various components of the encoding circuit 210, such as the predictor estimator 211, the predictor generator 222, the residual encoder 214, and/or the encoding controller 216, may be implemented by hardware components, the processor 224 executing the program instructions, or a combination thereof. Of course, the processor 224 can also execute program instructions to control receiving of the input image frames 202 and the output of the encoded video data 204. In some examples, the processor 224 can execute the program instructions to perform functions that may not be directly related to encoding the input image frames 202.

Furthermore, as shown in FIG. 2, the decoding circuit 230 can include at least a predictor generator 232, a residual decoder 234, and a decoding controller 236. The predictor generator 232 can generate a prediction portion of a block to be decoded (or a current block) in an image frame based on prediction information provided in the encoded video data 204. The prediction portion of the current block may include one or more intra predictors of corresponding prediction block(s) generated using intra prediction, or one or more inter predictors of corresponding prediction block(s) generated using inter prediction. The residue decoder 234 can generate a residual portion of the current block based on residual information provided in the encoded video data 204. The residual portion of the current block may include one or more reconstructed residual blocks corresponding to respective transform blocks(s). The decoding controller 236 can oversee the decoding of the encoded video data 204, including determining prediction parameters based on the prediction information, providing the prediction parameters to the predictor generator 232, determining residual parameters based on the residual information, providing the residual parameters to the residual decoder 234, and/or controlling the operation of the predictor generator 232 and the residual decoder 234.

For reconstructing each residual block, the residue decoder 234 may receive coded residual data, generate an input transformed residual block based on the coded residual data, and generate a reconstructed residual block by performing an inverse core transform and optionally an inverse secondary transform on the input transformed residual block that correspond to the inverse operations of the core transform and the secondary transform for encoding the current blocked.

The decoding controller 236 may further include a component-based transform selector 238. The component-based transform selector 238 can identify transform settings with respect to the inverse core transform or the inverse secondary transform to be performed by the residual decoder 234, and/or whether to apply the inverse secondary transform by the residual decoder 234. In some examples, the syntax elements indicating a portion or the entirety of the transform settings may be signaled in association with at least two respective representative color space components for at least two subsets of the predetermined color space, respectively. In some examples, the syntax elements indicating the transform settings may be all signaled in association with one representative color space component for all the color space components. Whether the syntax elements indicating the transform settings are signaled in association with one color space component for all colors space components or in association with at least two color space components for respective subsets of the color space components may be signaled using a dedicated flag extracted from the encoded video data 204 or derived without using the dedicated flag.

In operation, the decoding controller 236 may receive the encoded video data 204, including information of the current block to be decoded by the decoding circuit 230. The decoding controller 236 may extract from the encoded video data 204 the prediction information, including a prediction type and corresponding prediction parameters, for generating the prediction portion of the current block. The decoding controller 236 may extract from the encoded video data 204 coded residual data and corresponding transform settings for generating the residual portion of the current block. The predictor generator 232 may generate the prediction portion of the current block based on the prediction information provided by the decoding controller 236. The residual decoder 234 may generate the residual portion of the current block based on the encoded residual data and the transform settings provide by the component-based transform selector 238 of the decoding controller 236. Finally, the decoding controller 236 can generate the output image frames 206 based on the decoded current block, which is generated based on the generated prediction portion and the reconstructed residual portion of the current block.

The component-based transform selector 238 may identify the transform settings based on the syntax elements provide in the encoded video data 204. The component-based transform selector 238 can determine based on a dedicated flag extracted from the encoded video data 204, or derive without using the dedicated flag, whether the syntax elements indicating transform settings are to be signaled in association with one representative color space component for all the color space components, or in association with at least two representative color space components for respective subsets of the color space components. In some examples, the decoding controller 236 or the component-based transform selector 238 can extract the flag from a video level, picture level, slice level, tile level, or sequence level syntax element.

When the syntax elements are signaled in association with one representative color space component for all the color space components, the component-based transform selector 238 may identify a transform setting for decoding the current block when the current block corresponds to the representative color space component and provide the transform setting to the residual decoder 234. The component-based transform selector 238 may identify the transform setting for a collocated block that corresponds to the representative color space component for decoding the current block when the current block does not correspond to the representative color space component.

When the syntax elements are signaled in association with at least two representative color space components for respective subsets of the color space components, the component-based transform selector 238 may identify a transform setting for decoding the current block when the current block corresponds to one of the representative color space components and provide the transform setting to the residual decoder 234. The component-based transform selector 238 may identify the transform setting for a collocated block that corresponds to one of the representative color space components for the subset of the color space components the current block belongs when the current block does not correspond to any of the representative color space components.

Moreover, the transform settings for performing the core transform and the secondary transform may be signaled based on different grouping of the color space components. For example, when the syntax elements for performing the secondary transform are signaled in association with at least two representative color space components for respective subsets of the color space components, the syntax elements for performing the core transform may be signaled in association with only one representative color space components for all color space components.

The decoding circuit 230 may further include a memory 242 and a processor 244. The memory 242 can be used to store program instructions, information corresponding to the prediction modes, prediction parameters, encoded video data, reconstructed frames, generated predictors, residual blocks, and/or intermediate data for performing various functions of the decoding circuit 230. In some examples, the memory 242 includes a non-transitory computer readable medium, such as a semiconductor or solid-state memory, a random access memory (RAM), a read-only memory (ROM), a hard disk, an optical disk, or other suitable storage medium. In some embodiments, the memory 242 includes a combination of two or more of the non-transitory computer readable mediums listed above.

The processor 224 is electrically coupled with the memory 242 and can be configured to execute the program instructions stored in the memory 242 to perform various functions. The processor 244 can include a single or multiple processing cores. Various components of the decoding circuit 230, such as the predictor generator 232, the residual decoder 234, and/or the decoding controller 236, may be implemented by hardware components, the processor 244 executing the program instructions, or a combination thereof. Of course, the processor 244 can also execute program instructions to control receiving of the encoded video data 204 and the output of the output image frames 206. In some examples, the processor 244 can execute the program instructions to perform functions that may not be directly related to decoding the encoded video data 204.

Furthermore, the encoding circuit 210 and the decoding circuit 230 may be implemented in the same electronic device, and various components of the encoding circuit 210 and the decoding circuit 230 may be shared or reused. For example, one or more of the memory 222, processor 224, and predictor generator 212 in the encoding circuit 210 may also be used to function as the memory 242, processor 244, and predictor generator 232 in the decoding circuit 230, respectively.

Figure 3:
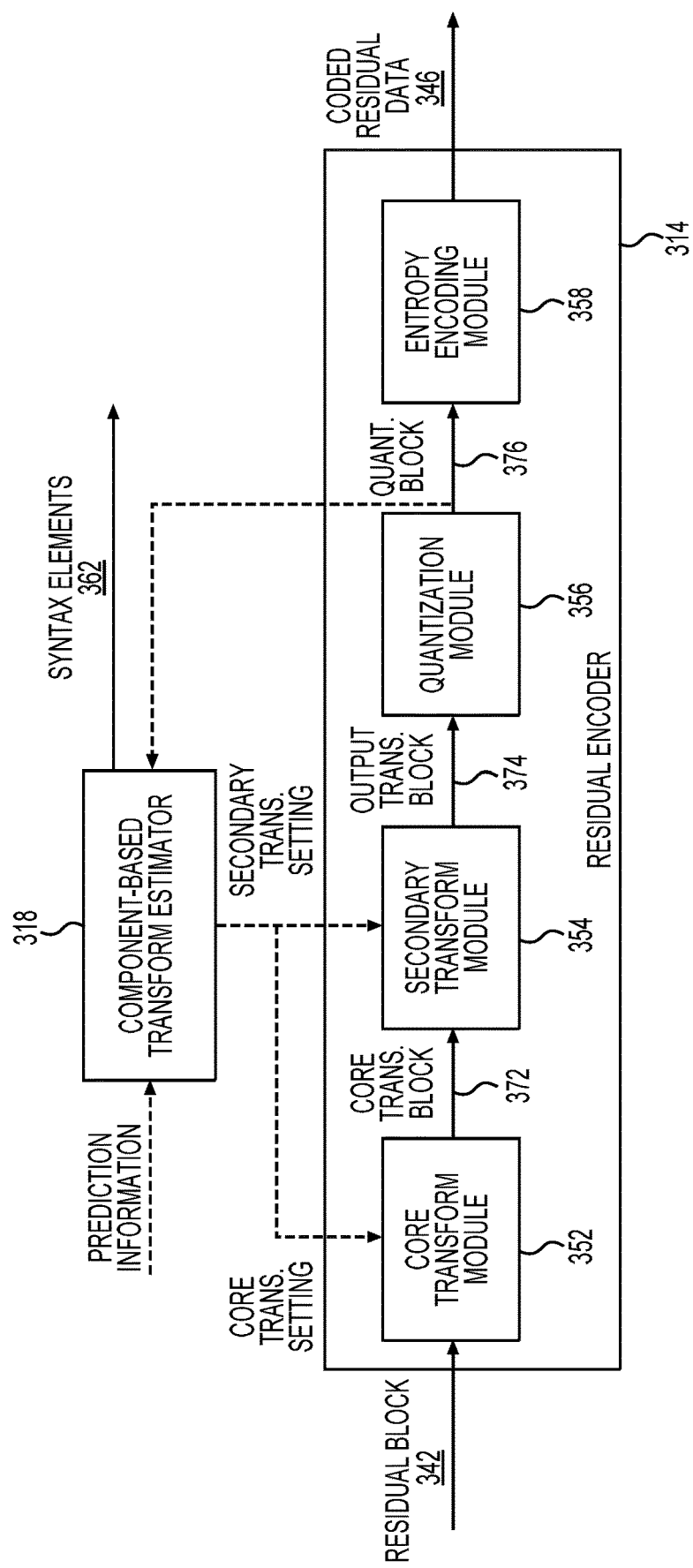
FIG. 3 shows an exemplary functional block diagram of the residual encoder together with the component-based transform estimator in the video coding system in FIG. 2 according to an embodiment of the disclosure.

FIG. 3 shows an exemplary functional block diagram of a residual encoder 314 together with a component-based transform estimator 318, such as the residual encoder 214 and the component-based transform estimator 218 in the video coding system 200 in FIG. 2, according to an embodiment of the disclosure. The residual encoder 314 can receive a residual block 342 and process the residual block 342 to output coded residual data 346. The component-based transform estimator 318 can work with the residual encoder 314 to determine transform settings for encoding the residual block 342 and generate syntax elements 362 for signaling the determined transform settings.

The residual encoder 314 includes a core transform module 352, a secondary transform module 354, a quantization module 356, and an entropy encoding module 358. The core transform module 352 can perform a core transform process on the residual block 342 to output a core transformed block 372. The secondary transform module 354 can perform a secondary transform process on the core transformed block 372 to output a secondary transformed block as an output transformed block 374. In some examples, the secondary transform module 354 may be bypassed, and the core transformed block 372 is the same as the output transformed block. 374. The quantization module 356 may perform a quantization process on the output transformed block 374 to output a quantized block 376. Finally, the entropy encoding module 358 can perform an entropy encoding process on the quantized block 376 to output the coded residual data 346.

The core transform can transform the residual block 342 from a spatial domain to a frequency domain. The core transform may be a discrete cosine transform (DCT) or a discrete sine transform (DST), or the like. The core transformed block 372 is thus a frequency domain representation of the residual block 342. In many applications, while the pixel values of the residual block 342 may be randomly distributed, the coefficients of the core transformed block 374 would tend to be clustered at lower frequencies. If the secondary transform module 354 is bypassed and the core transformed block 372 is used as the output transformed block 374, the quantization module 356 can quantize the core transformed block 372 by using more quantization levels at the lower frequencies and using less quantization levels at the higher frequencies. The entropy encoding module 358 can encode the quantized block 376 from the quantization module 356 to output the coded residual data 346.

The secondary transform module 354, if activated, can transform the core transformed block 372 into a secondary transformed block as the output transformed block 374. Compared with the core transformed block 372, the coefficients of the corresponding secondary transformed block may have a better clustered distribution, more zero coefficients, more insignificant coefficients, or any distribution that would improve the coding efficiency after quantization. The secondary transform may be a rotational transform (ROT) that is performed based on a rotational transform matrix that rotates the core transformed block 372, where the rotational transform matrix can be selected from candidate rotational transform matrices that are determined based on an intra prediction mode for encoding the predictor counterpart of the residual block 342. Moreover, the secondary transform may be a non-separable secondary transform (NSST) that is performed based on an off-line trained transform matrix, which can also be selected from candidate transform matrices that are determined based on an intra prediction mode for encoding the predictor counterpart of the residual block 342. In some examples, the secondary transform module 354 can be bypassed by being deactivated or using an identity matrix for performing the secondary transform.

In operation, the core transform module 352 receives the residual block 342. The component-based transform estimator 318 may provide the core transform module 352 a core transform setting with respect to the type of core transform for processing the residual block 352. When the residual block 342 corresponds to a representative color space component for all or a respective subset of the color space components of a predetermined color space, the component-based transform estimator 318 can work with the core transform module 352, the secondary transform module 354, and/or the quantization module 356 to try different core transform settings in order to determine a final core transform setting for processing the residual block 342. When the residual block 342 does not corresponds to a representative color space component, the component-based transform estimator 318 can provide the final core transform setting that has been determined for a collocated block that corresponds to the representative color space component for all color space components or the subset the residual block 342 belongs.

After the core transform module 352 processes the residual bock 342 based on the core transform setting provided by the component-based transformer estimator 318, the secondary transform module 354 receives the core transformed block 372 from the core transform module 352. The component-based transform estimator 318 may provide the secondary transform module 354 a secondary transform setting with respect to the selected transform matrix for processing the core transformed block 372. When the residual block 342 corresponds to a representative color space component for all or a respective subset of the color space components of a predetermined color space, the component-based transform estimator 318 can work with the secondary transform module 354 and/or the quantization module 356 to try different secondary transform settings in order to determine a final secondary transform setting for processing the core transformed block 372. When the residual block 342 does not corresponds to a representative color space component, the component-based transform estimator 318 can provide the final secondary transform setting that has been determined for a collocated block that corresponds to the representative color space component for all color space components or the subset the residual block 342 belongs. Of course, the secondary transform setting may include bypassing the secondary transform.

After the secondary transform module 354 processes the core transformed bock 372 based on the secondary transform setting provided by the component-based transform estimator 318, the quantization module 356 performs a quantization process on the output transformed block 374 from the secondary transform module 354. The quantization module 356 may output the quantized block 376 to the entropy encoding module 358, which would encode the quantized block 376 into code residual data 346. When the residual block 342 corresponds to a representative color space component for all or a respective subset of the color space components of a predetermined color space, the quantization module 356 may output the quantized block 376 to the component-based transformer estimator 318 for further analysis in order to determine whether the current core transform setting and/or the current secondary transform setting is acceptable.

The component-based transform estimator 318 may receive prediction information of the predictor counterpart of the residual block 342 and may determine the candidate core transform setting and/or the candidate secondary transform setting based on at least an intra prediction mode of the predictor counterpart. When the residual block 342 corresponds to a representative color space component for all or a respective subset of the color space components of a predetermined color space, the component-based transform estimator 318 can work with the residual encoder 314 to determine the final core transform setting and/or the final secondary transform setting, and generate syntax elements 362 indicating the final core transform setting and/or the final secondary transform setting that are to be encoded in association with the respective representative color space component. In some examples, the syntax elements 362 may include a type of the core transform. In some examples, the syntax elements 362 may include whether to perform the secondary transform, a type of the secondary transform, candidate transform matrices for the secondary transform, and/or selected transform matrix for the secondary transform.

Moreover, the component-based transform estimator 318 can generate a dedicated flag indicating how the transform settings are to be signaled in association with various color space components. In some examples, the transform settings may be signaled in association with one representative color space component for all color space components of the predetermined color space. In some examples, the transform settings may be signaled in association with at least two representative color space components for respective subsets of the color space components of the predetermined color space. The flag may be included in the encoded video data using a video level, picture level, slice level, tile level, or sequence level syntax element.

Figure 4:
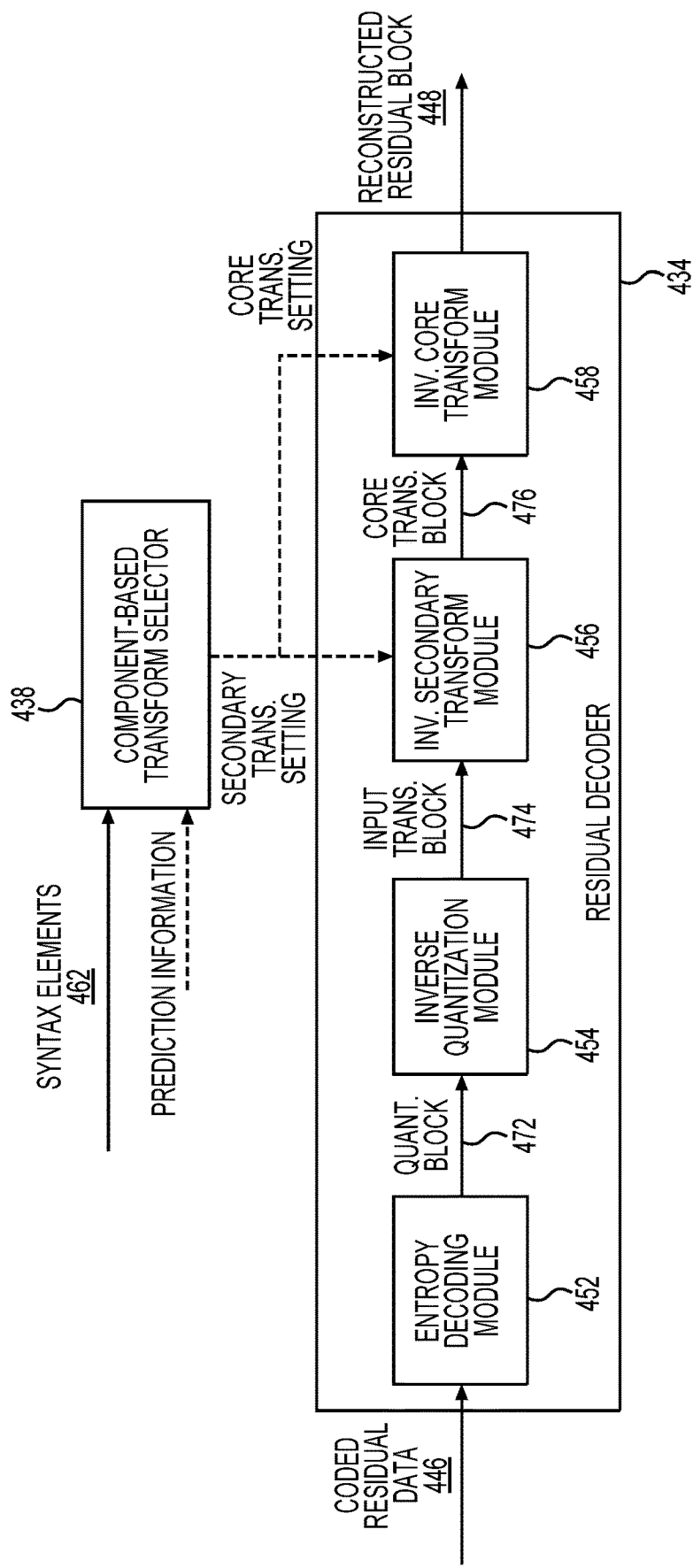
FIG. 4 shows an exemplary functional block diagram of the residual decoder together with the component-based transform selector in the video coding system in FIG. 2 according to an embodiment of the disclosure.

FIG. 4 shows an exemplary functional block diagram of a residual decoder 434 together with a component-based transform selector 438, such as the residual decoder 234 and the component-based transform selector 238 in the video coding system 200 in FIG. 2 according to an embodiment of the disclosure. The residual decoder 434 can receive coded residual data 446 provided in encoded video data and decode the coded residual data 446 to output a reconstructed residual block 448. The component-based transform selector 438 can receive syntax elements and/or prediction information provided in the encoded video data, and identify and provide the residual decoder 434 the transform settings for decoding the coded residual data 446.

The residual decoder 434 includes an entropy decoding module 452, an inverse quantization module 454, an inverse secondary transform module 456, and an inverse core transform module 458. The entropy decoding module 452 can reverse the entropy encoding process performed by the entropy encoding module 358 by performing a corresponding entropy decoding process on the encoded residual data 446 to output a quantized block 472. The inverse quantization module 454 can reverse the quantization process performed by the quantization module 356 by performing a corresponding inverse quantization process on the quantized block 472 to output an input transformed block 474. The inverse secondary transform module 456 can reverse the secondary transform performed by the secondary transform module 354 by performing a corresponding inverse secondary transform on the input transformed block 474 to become a core transformed block 476. In some examples, the corresponding secondary transform may include bypassing secondary transform process. Accordingly, the inverse secondary transform module 456 may also be bypassed and the input transformed block 474 may be the same as the core transformed block 476. The inverse core transform module 458 can reverse the core transform performed by the core transform module 352 by performing a corresponding inverse core transform process on the core transformed block 476 to output the reconstructed residual block 448.

The inverse core transform can transform the core transformed block 476, which is the frequency domain representation of the reconstructed residual block 448, from the frequency domain back to the spatial domain. The inverse core transform may be an inverse DCT or an inverse DST, or the like. The inverse secondary transform module 456, if activated, can transform the input transformed block 474 into the core transformed block 476. The inverse secondary transform may be an inverse ROT or an inverse NSST, or the like. In some examples, when the inverse secondary transform module 456 is activated, the inverse secondary transform can still be set to be bypassed or performed using an identity matrix.

In operation, the component-based transform selector 438 may determine based on a flag provided in the encoded video, or derive without using the flag, how the transform settings are to be signaled in association with various color space components. In some examples, the transform settings may be signaled in association with one representative color space component for all color space components of the predetermined color space. In some examples, the transform settings may be signaled in association with at least two representative color space components for respective subsets of the color space components of the predetermined color space. The flag may be included in the encoded video data using a video level, picture level, slice level, tile level, or sequence level syntax element.

The component-based transform selector 438 may further receive syntax elements 462 indicating the core transform setting and/or the secondary transform setting in association with the representative color space component. The component-based transform selector 438 may identify the core transform setting and/or the secondary transform setting for decoding the coded residual data signaled by the syntax elements 462. In some examples, the component-based transform selector 438 may receive prediction information of the predictor counterpart of the to-be-reconstructed residual block and identify the candidate core transform setting and/or the candidate secondary transform setting based on at least an intra prediction mode of the predictor counterpart. In some examples, the syntax elements 462 may include a type of the core transform. In some examples, the syntax elements 462 may include whether to perform the secondary transform, a type of the secondary transform, candidate transform matrices for the secondary transform, and/or selected transform matrix for the secondary transform.

When the residual block as coded by the coded residual data 446 corresponds to a representative color space component for all or a respective subset of the color space components of a predetermined color space, the component-based transform selector 438 can identify the core transform setting and/or the secondary transform setting as indicated in the syntax elements 462. When the residual block as coded by the coded residual data 446 does not corresponds to a representative color space component, the component-based transform selector 438 can provide the core transform setting and/or the secondary transform setting that has been identified for a collocated block that corresponds to the representative color space component for all color space components or the subset the residual block belongs.

Also, in operation, the entropy decoding module 452 can receive and decode the code residual data 446 in to a quantized block 472. The inverse quantization module 454 can process the quantized block 472 from the entropy decoding module 452 and output the input transformed block 474. The inverse secondary transform module 456 can receive the secondary transform setting from the component-based transform selector 438 and perform an inverse secondary transform process on the input transformed block 474 to output a core transformed block 476 according to the received secondary transform setting. In some examples, the secondary transform setting may include bypassing the inverse secondary transform. Finally, the inverse core transform module 458 can receive the core transform setting from the component-based transform selector 438 and perform an inverse core transform process on the core transformed block 476 to output the reconstructed residual block 448 according to the received core transform setting.

Figure 5A:
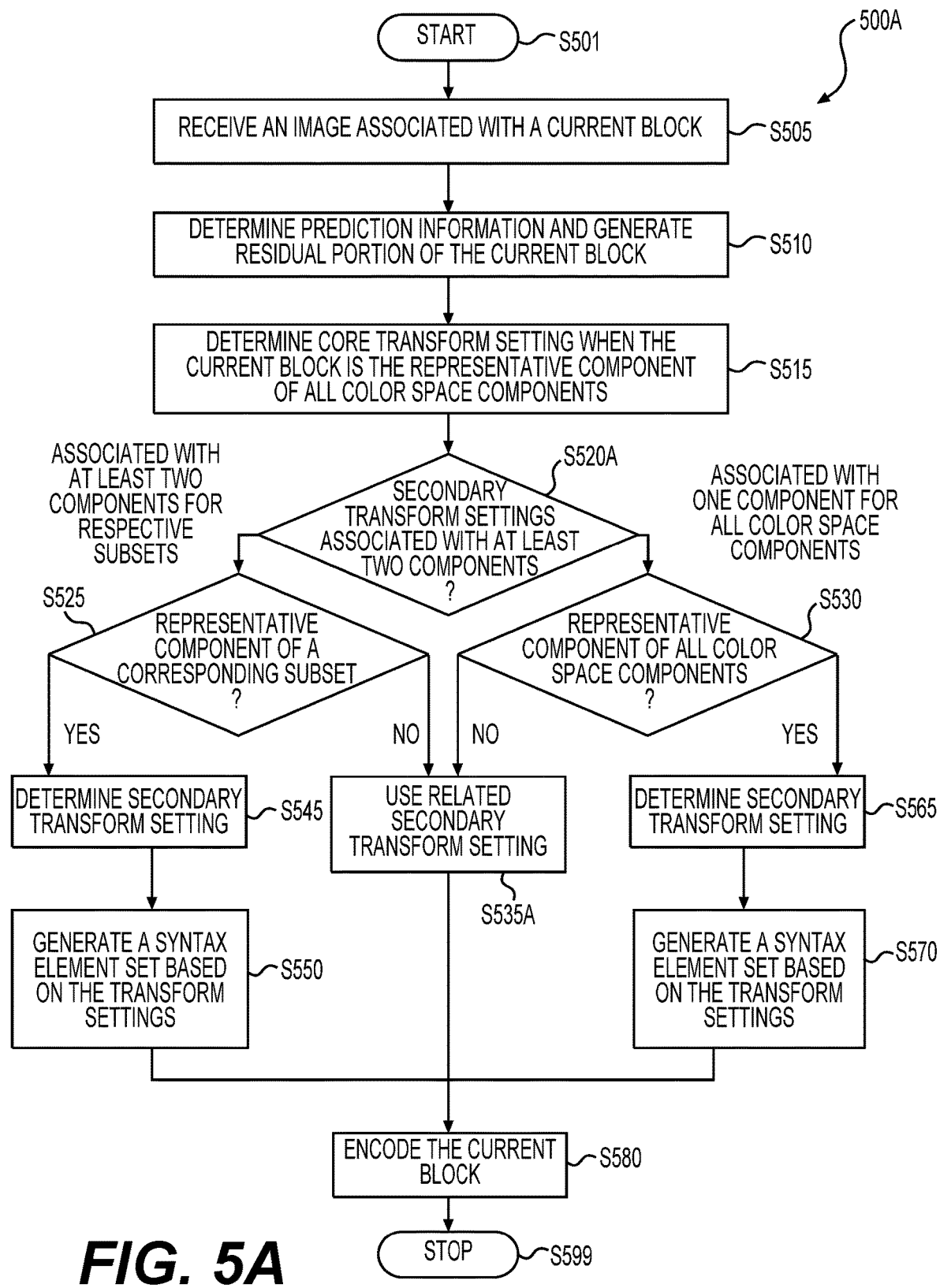
FIG. 5A shows a flow chart outlining an exemplary encoding process using a residual decoder, such as the residual encoder in FIG. 3, according to an embodiment of the disclosure.

FIG. 5A shows a flow chart outlining an exemplary encoding process 500A using an encoding circuit, such as the encoding circuit 210 in FIG. 2 having the residual encoder 314 illustrated with reference to FIG. 3, according to an embodiment of the disclosure. It is understood that additional operations may be performed before, during, and/or after the process 500A depicted in FIG. 5A. The process 500A starts at S501 and proceeds to S505.

At S505, an image frame associated with a block to be encoded (i.e., the current block) is received. For example, the encoding controller 216 may receive the input image frames 202 that includes the original block image associated with the current block.

At S510, the prediction information for encoding the current block is determined. After determining the prediction information, at S510, a prediction portion of the current block is generated based on the determined prediction information, and a residual portion of the current block is generated based on a difference between the original image and the prediction portion of the current block. For example, the predictor estimator 211 may determine the prediction information that includes at least a prediction type, a prediction mode, and/or prediction parameters for generating the prediction portion of the current block. The predictor generator 212 may generate the prediction portion of the current block based on the prediction information from the predictor estimator 211. The encoding controller 216 may generate the residual portion of the current block based on the original image of the current block and the prediction portion from the predictor generator 212.

In this example, a core transform setting for performing a core transform process is to be signaled in association with a representative color space component for all color space components. Therefore, at S515, the final transform setting for performing a core transformed process is determined when the current block is the representative color space component of all color space components. For example, component-based transform estimator 218 can work with residual encoder 214 to determine the final core transform setting for the current block, as further illustrated with reference to FIG. 3.

At S520A, whether a secondary transform setting for performing a secondary transform process is to be signaled in association with a representative color space component for all color space components or in association with at least two representative color space components for respective subset of color space components is determined. If the secondary transform setting is to be signaled in association with at least two representative color space components for respective subset of color space components, the process proceeds to S525. If the secondary transform setting is to be signaled in association with only one representative component for all color space components, the process proceeds to S530.

At S525, whether the current block corresponds to a representative color space component of a corresponding subset that the current block belongs is determined. If the current block corresponds to a representative color space component, the process proceeds to S545. If the current block does not correspond to a representative color space component, the process proceeds to S535A.

Also, at S530, whether the current block corresponds to a representative color space component for all color space components is determined. If the current block corresponds to the representative color space component, the process proceeds to S565. If the current block does not correspond to the representative color space component, the process proceeds to S535A.

At 535A, the secondary transform setting previously determined for the representative color space component for all color space components or the subset the current cloth belongs is used as the secondary transform setting for the current block.

In some examples, the components-based transform estimator 318 can be used to perform S520A, S525, S530, and S535A.

At S545 or S565, a final secondary transform setting is determined for the current block. For example, the component-based based transform estimator 318 can work with the secondary transform module 354 and the quantization module 356 to determine the final secondary transform setting for the current block. After S545, the process proceeds to S550. After S565, the process proceeds to S570.

At S550 or S570, a syntax element set indicting the core transform setting and the secondary transform setting for the current block is generated. For example, if the component-based transforms estimate of 318 can generate a syntax element set based on the determined transform settings for the current block.

After S535A, S550, and S570, the process proceeds to S580. At S580, the current block is encoded based on the transform settings determined at S515, S535A, S545, and/or S565. The current block is encoded further based on the syntax element set generated at S550 or S570 when the current block corresponds to a representative color space component. For example, the encoding controller 216 and can encode the current block based on the transform settings and/or the syntax elements set.

After S580, the process proceeds to S599 and terminates.

Figure 5B:
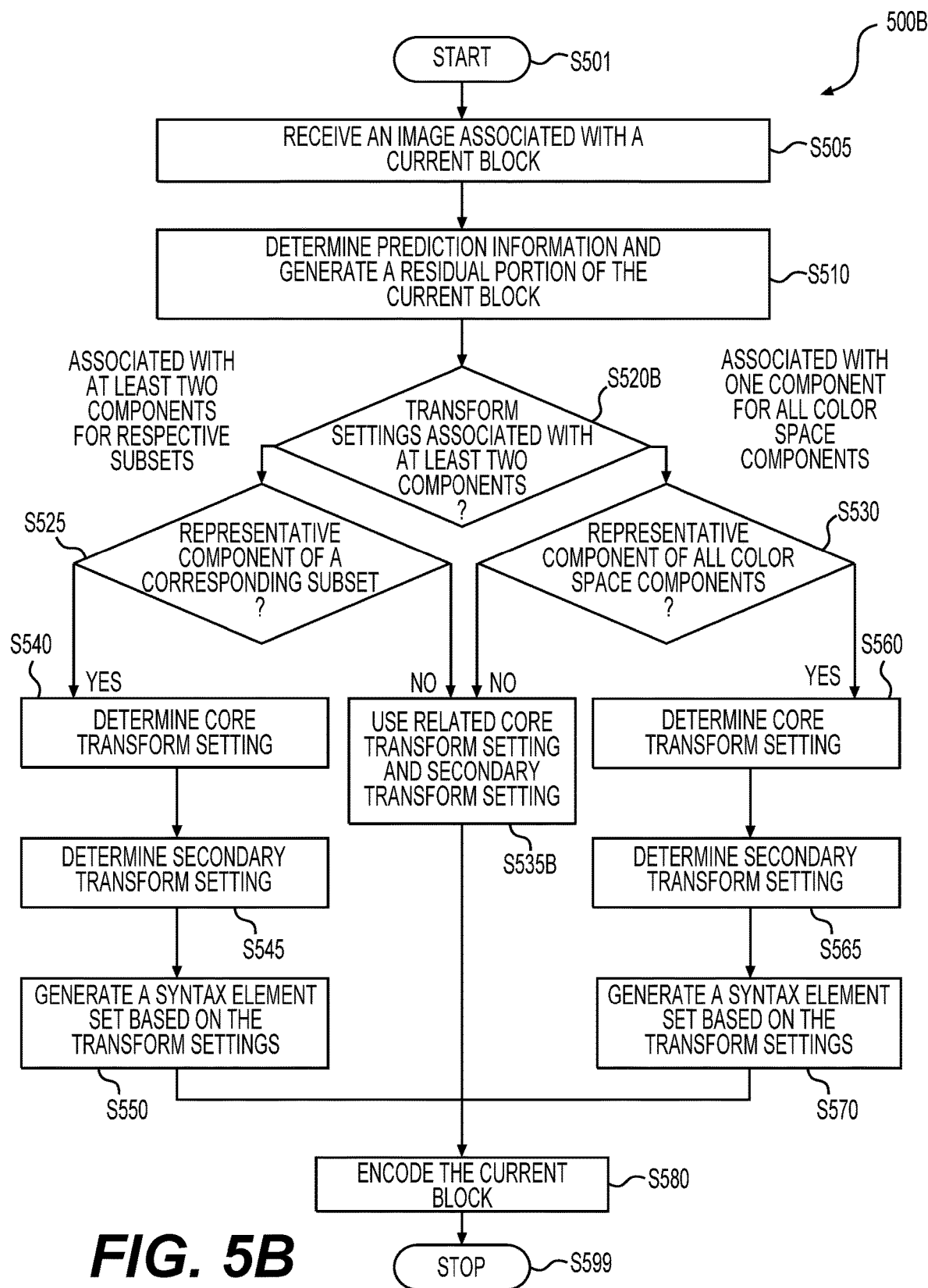
FIG. 5B shows a flow chart outlining another exemplary encoding process using a residual decoder, such as the residual encoder in FIG. 3, according to an embodiment of the disclosure.

FIG. 5B shows a flow chart outlining another exemplary encoding 500B using an encoding circuit, such as the encoding circuit 210 in FIG. 2 having the residual encoder 314 illustrated with reference to FIG. 3, according to an embodiment of the disclosure. It is understood that additional operations may be performed before, during, and/or after the process 500B depicted in FIG. 5B. Also, components and FIG. 5B that are the same or similar to those in FIG. 5A are given the same reference numbers, and detailed description thereof may be omitted.

Compared with the process 500A, the core transform setting in the process 500B may be provided using the syntax element set to be signaled in association with one representative color space component for all color space components, or in association with at least two representative color space components for respective subsets of color space components. Therefore, after S510, the process proceeds to S520B, which corresponds to S520A in FIG. 5A.

At S520B, whether the transform settings for performing a core transform and a secondary transform process are to be signaled in association with a representative color space component for all color space components or in association with at least two representative color space components for respective subset of color space components is determined. If the transform settings are to be signaled in association with at least two representative color space components for respective subset of color space components, the process proceeds to S525. If the transform settings are to be signaled in association with only one representative component for all color space components, the process proceeds to S530.

At S525, whether the current block corresponds to a representative color space component of a corresponding subset that the current block belongs is determined. If the current block corresponds to a representative color space component, the process proceeds to S540. If the current block does not correspond to a representative color space component, the process proceeds to S535B.

Also, at S530, whether the current block corresponds to a representative color space component for all color space components is determined. If the current block corresponds to the representative color space component, the process proceeds to S560. If the current block does not correspond to the representative color space component, the process proceeds to S535B.

At 535B, the core transform setting and the secondary transform setting previously determined for the representative color space component for all color space components or the subset the current cloth belongs is used as the core transform setting and the secondary transform setting for the current block. After S535B, the process proceeds to S580.

At S540 or S560, a final core transform setting is determined for the current block. For example, the component-based based transform estimator 318 can work with the core transform module 352 and the quantization module 356 to determine the final core transform setting for the current block. After S540, the process proceeds to S545. After S560, the process proceeds to S565.

After S535B, S540, and S560, S545, S550, S565, S570, and S580 are performed in a manner as described with reference to FIG. 5A, and detailed description thereof is thus omitted.

As shown in FIGS. 5A and 5B, when encoding a first block that corresponds to a first color space component and a second block that corresponds to a second color space component, the syntax elements indicating the transform settings for processing the first and second blocks may be signaled in association with the first color space component for both first and second color space components, or in association with the first color space component and second color space component individually. In some examples, when the transform are to be signaled in association with the first color space component and second color space component individually, transform settings for processing the first transformed block and the second transformed block may be separately determined. A first syntax element set indicating a first transform setting for the first block and to be signaled in association with the first color space component may be generated. Also, a second syntax element set indicating a second transform setting for the second block and to be signaled in association with the second color space component may be generated. The encoded video data may be generated to include the first syntax element set and the second syntax element set.

Figure 6A:
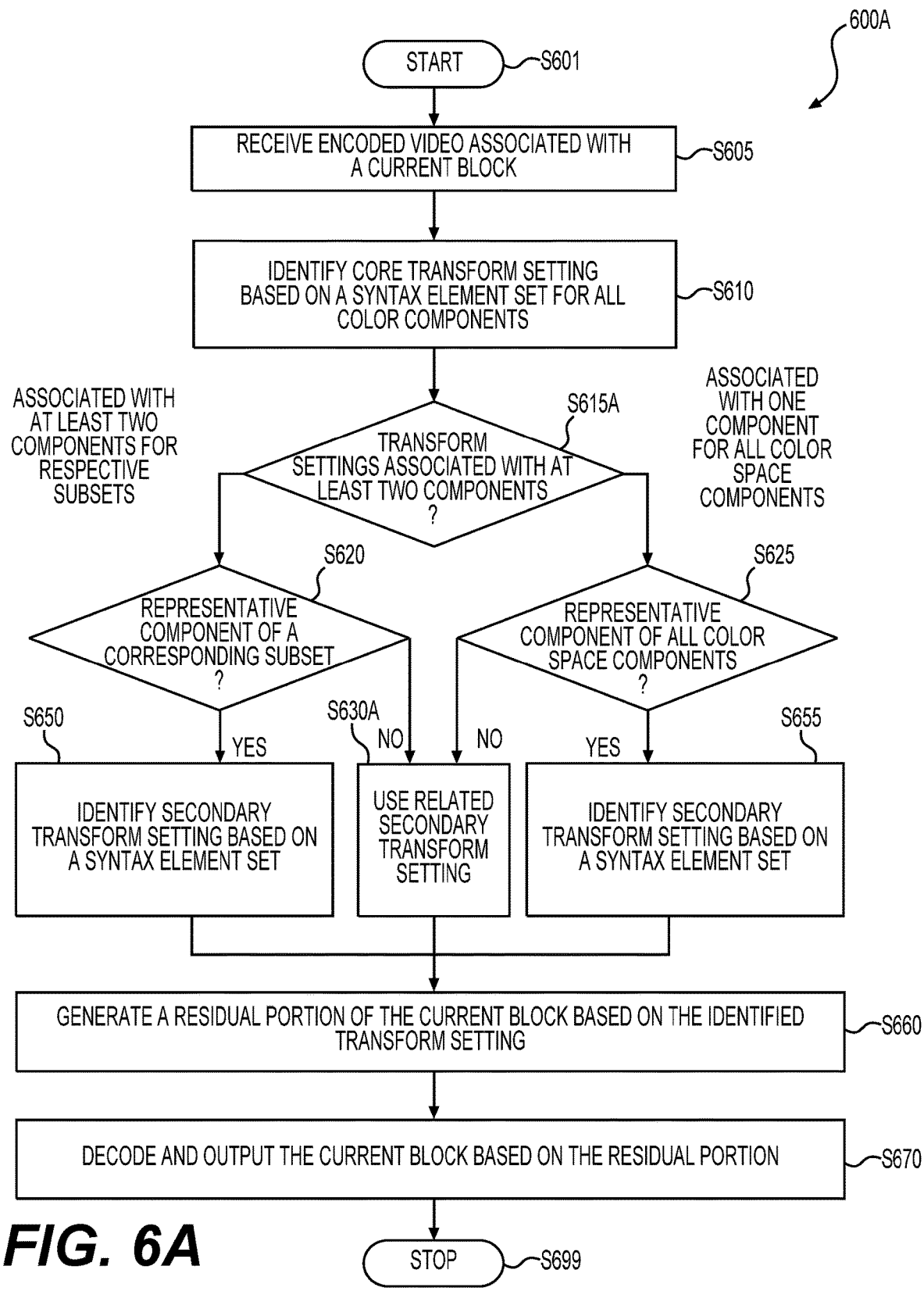
FIG. 6A shows a flow chart outlining an exemplary decoding process using a residual decoder, such as the residual decoder in FIG. 4, according to an embodiment of the disclosure.

FIG. 6A shows a flow chart outlining an exemplary decoding process 600A using a decoding circuit, such as the decoding circuit 230 in FIG. 2 having the residual decoder 434 illustrated with reference to FIG. 4, according to an embodiment of the disclosure. It is understood that additional operations may be performed before, during, and/or after the process 600A depicted in FIG. 6A. The process 600A starts at S601 and proceeds to S605.

At S605, the encoded video data corresponding associated with a block to be decoded (i.e., the current block) is received. For example, the decoding controller 236 may receive the encoded video data 204 that includes information for decoding the current block.

In this example, a core transform setting for performing a core transform process is signaled in association with a representative color space component for all color space components. Therefore, at S610, the core transform setting for the current block is identified based on a syntax element set signaled in association with a representative color space component for all color space components. For example, component-based transform selector 238 can extract the core transform setting provided in the encoded video data 204 when the current block corresponds to a representative color space component, and use the core transform setting previously identified for a collocated block that corresponds to the representative color space component as the core transform setting for the current block.

At S615A, whether a secondary transform setting for performing a secondary transform process is signaled in association with a representative color space component for all color space components or in association with at least two representative color space components for respective subset of color space components is determined. If the secondary transform setting is signaled in association with at least two representative color space components for respective subset of color space components, the process proceeds to S620. If the secondary transform setting is to be signaled in association with only one representative component for all color space components, the process proceeds to S625.

At S620, whether the current block corresponds to a representative color space component of a corresponding subset that the current block belongs is determined. If the current block corresponds to a representative color space component, the process proceeds to S650. If the current block does not correspond to a representative color space component, the process proceeds to S630A.

Also, at S625, whether the current block corresponds to a representative color space component for all color space components is determined. If the current block corresponds to the representative color space component, the process proceeds to S655. If the current block does not correspond to the representative color space component, the process proceeds to S630A.

At 630A, the secondary transform setting previously identified for the representative color space component for all color space components or the subset the current cloth belongs is used as the secondary transform setting for the current block.

In some examples, the components-based transform selector 438 can be used to perform S615A, S620, S625, and S630A.

At S650 or S655, a secondary transform setting is identified for the current block based on a syntax set signaled in association with the color space component to which the current block corresponds. For example, the component-based based transform selector 438 can identify the secondary transform setting from the syntax set for the current block. After S565, S655, and S630A, the process proceeds to S660.

At S660, the residual portion of the current block is generated based on the identified for transform setting and secondary transform setting. For example, the component-based transform selector 238 can provide the identified core transform setting and secondary transform setting to the residual decoder 234. The residual decoder 234 can generate the residual portion of the current block based on the identified transform settings.

At 5670, the reconstructed image of the current block can be decode and output based on the reconstructed residual portion. After 5670, the process proceeds to 5699 and terminates.

Figure 6B:
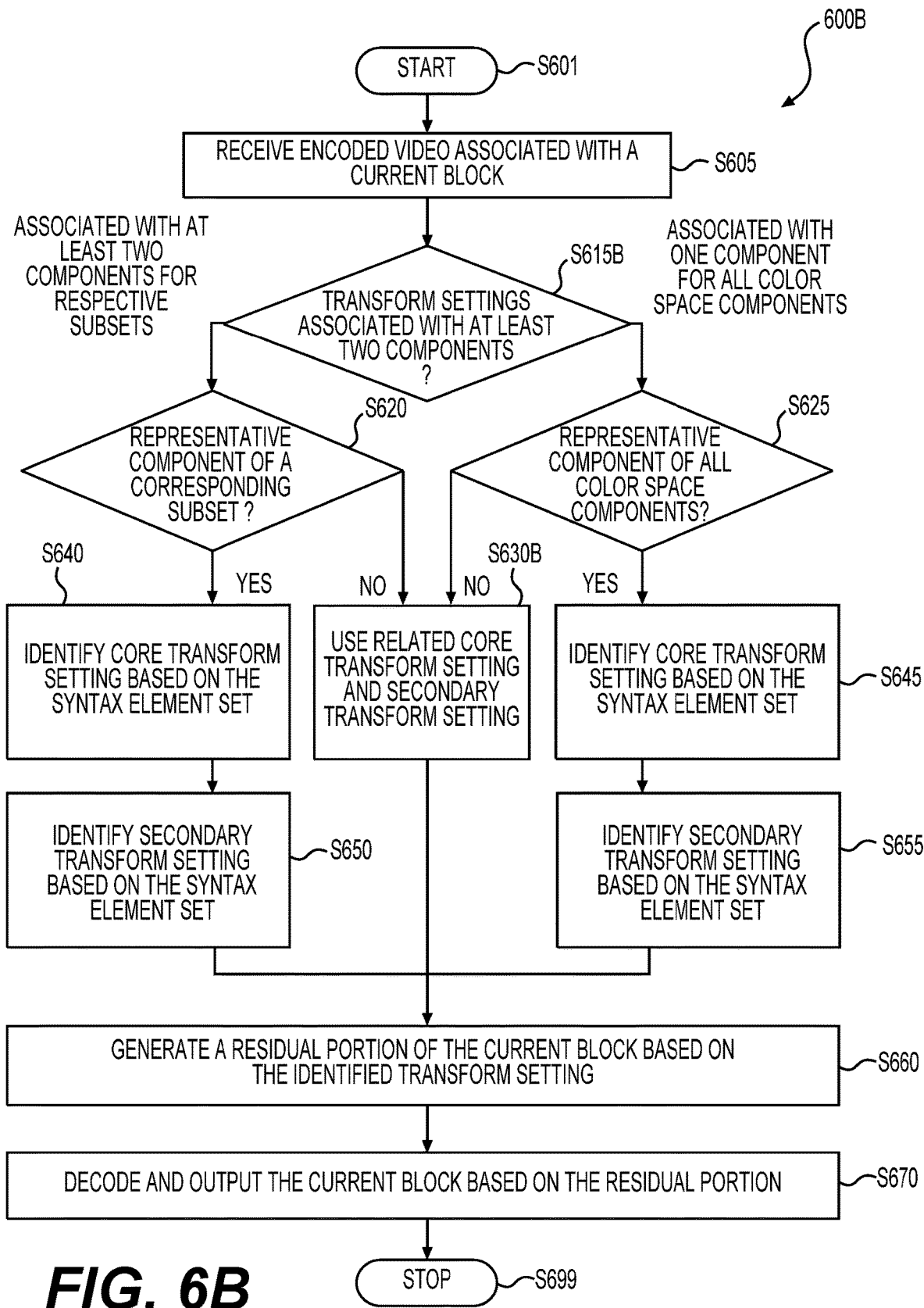
FIG. 6B shows a flow chart outlining another exemplary decoding process using a residual decoder, such as the residual decoder in FIG. 4, according to an embodiment of the disclosure.

FIG. 6B shows a flow chart outlining another exemplary decoding process 600B using a decoding circuit, such as the decoding circuit 230 in FIG. 2 having the residual decoder 434 illustrated with reference to FIG. 4, according to an embodiment of the disclosure. It is understood that additional operations may be performed before, during, and/or after the process 600B depicted in FIG. 6B. Also, components and FIG. 6B that are the same or similar to those in FIG. 6A are given the same reference numbers, and detailed description thereof may be omitted.

Compared with the process 600A, the core transform setting in the process 600B may be provided using the syntax element set to be signaled in association with one representative color space component for all color space components, or in association with at least two representative color space components for respective subsets of color space components. Therefore, after S605, the process proceeds to S615B, which corresponds to S615A in FIG. 6A.

At S615B, whether the transform settings for performing a core transform and a secondary transform process are signaled in association with a representative color space component for all color space components or in association with at least two representative color space components for respective subset of color space components is determined. If the transform settings are signaled in association with at least two representative color space components for respective subset of color space components, the process proceeds to 5620. If the transform settings are to be signaled in association with only one representative component for all color space components, the process proceeds to S625.

At S620, whether the current block corresponds to a representative color space component of a corresponding subset that the current block belongs is determined. If the current block corresponds to a representative color space component, the process proceeds to S640. If the current block does not correspond to a representative color space component, the process proceeds to S630B.

Also, at S625, whether the current block corresponds to a representative color space component for all color space components is determined. If the current block corresponds to the representative color space component, the process proceeds to S645. If the current block does not correspond to the representative color space component, the process proceeds to S630B.

At 630B, the core transform setting and the secondary transform setting previously identified for the representative color space component for all color space components or the subset the current cloth belongs is used as the core transform setting and the secondary transform setting for the current block. After S630B, the process proceeds to S660.

At S640 or S640, a core transform setting is identified for the current block based on the syntax element set signaled in association with the color space component to which the current block corresponds. For example, the component-based based transform selector 438 can identify the core transform setting from the syntax set for the current block. After S640, the process proceeds to S 650. After S645, the process proceeds to S655.

After S630B, S640, and S645, S650, S655, S660, and S670 are performed in a manner as described with reference to FIG. 6A, and detailed description thereof is thus omitted.

As shown in FIGS. 6A and 6B, when decoding encoded video data for reconstructing a first block that corresponds to a first color space component and a second block that corresponds to a second color space component, the syntax elements indicating the transform settings for processing the first and second blocks may be signaled in association with the first color space component for both first and second color space components, or in association with the first color space component and second color space component individually. In some examples, when the transform are signaled in association with the first color space component and second color space component individually, transform settings for processing the first transformed block and the second transformed block may be separately identified. A first transform setting for the first block may be identified based on a first syntax element set signaled in association with the first color space component. Also, a second transform setting for the second block may be identified based on a second syntax element set signaled in association with the second color space component.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A video encoding device, comprising:
a processing circuit configured to:
receive a first block, a second block, and a third block of an image frame, wherein the first block corresponds to a first color space component of a color space, the second block corresponds to a second color space component of the color space, and the third block corresponds to a third color space component of the color space;
apply a first transform process to a first residual portion of the first block, a second residual portion of the second block, and a third residual portion of the third block to generate a first transformed block, a second transformed block, and a third transformed block, respectively;
when a second transform process is to be applied to the first transformed block and the second transformed block,
generate a first syntax element set to be signaled in association with the first color space component, the first syntax element set indicating a first transform setting for applying the second transform process to the first transformed block,
generate a second syntax element set to be signaled in association with the second color space component, the second syntax element set indicating a second transform setting for applying the second transform process to the second transformed block, and
generate encoded video data for output to include the first syntax element set and the second syntax element set;
determine whether a third transform setting for applying the second transform process to the third transformed block is to be signaled in association with the third color space component or the second color space component;
when the third transform setting is determined to be signaled in association with the third color space component, determine the third transform setting and generate a third syntax element set to be signaled in association with the third color space component; and
when the third transform setting is determined to be signaled in association with the second color space component, use the second transform setting as the third transform setting, without generating the third syntax element set.

2. The video encoding device according to claim 1, wherein
the determined first transform setting includes information indicating first candidate transform matrices, or a selected first transform matrix, for the second transform process to be applied to the first transformed block, and
the determined second transform setting includes information indicating second candidate transform matrices, or a selected second transform matrix, for the second transform process to be applied to the second transformed block.

3. The video encoding device according to claim 1, wherein the processing circuit is further configured to include a flag in the encoded video data, the flag indicating whether the third transform setting is to be signaled in association with the third color space component or the second color space component.

4. The video encoding device according to claim 3, wherein the processing circuit is further configured to include the flag using a video level, picture level, slice level, tile level, or sequence level syntax element.

5. The video encoding device according to claim 1, wherein the processing circuit is further configured to determine whether the third transform setting is to be signaled in association with the third color space component or the second color space component based on block partitioning structures corresponding to the second color space component and the third color space component.

6. The video encoding device according to claim 5, wherein the processing circuit is further configured to:
determine that the third transform setting is to be signaled in association with the second color space component when the block partitioning structures corresponding to the second color space component and the third color space component are the same; and
determine that the third transform setting is to be signaled in association with the third color space component when the block partitioning structures corresponding to the second color space component and the third color space component are the different.

7. The video encoding device according to claim 1, wherein the first color space component corresponds to a luma component, and the second color space component corresponds to a chroma component.

8. The video encoding device according to claim 1, wherein the second color space component corresponds to a first chroma component, and the third color space component corresponds to a second chroma component.

9. A video encoding method, comprising:
receiving a first block, a second block, and a third block of an image frame, wherein the first block corresponds to a first color space component of a color space, the second block corresponds to a second color space component of the color space, and the third block corresponds to a third color space component of the color space;
applying a first transform process to a first residual portion of the first block, a second residual portion of the second block, and a third residual portion of the third block to generate a first transformed block, a second transformed block, and a third transformed block, respectively;
when a second transform process is to be applied to the first transformed block and the second transformed block,
generating a first syntax element set to be signaled in association with the first color space component, the first syntax element set indicating a first transform setting for applying the second transform process to the first transformed block,
generating a second syntax element set to be signaled in association with the second color space component, the second syntax element set indicating a second transform setting for applying the second transform process to the second transformed block, and
generating encoded video data for output to include the first syntax element set and the second syntax element set;
determining whether a third transform setting for applying the second transform process to the third transformed block is to be signaled in association with the third color space component or the second color space component;
when the third transform setting is determined to be signaled in association with the third color space component, determining the third transform setting and generating a third syntax element set to be signaled in association with the third color space component; and
when the third transform setting is determined to be signaled in association with the second color space component, using the second transform setting as the third transform setting, without generating the third syntax element set.

10. A video decoding device, comprising:
a processing circuit configured to:
receive encoded video data associated with a first block, a second block, and a third block of an image frame, wherein the first block corresponds to a first color space component of a color space, the second block corresponds to a second color space component of the color space, and the third block corresponds to a third color space component of the color space;
obtain a first transformed block of a first residual portion of the first block and a second transformed block of a second residual portion of the second block from the encoded video data, including
when a first inverse transform process is to be applied to a first encoded residual portion of the first block and a second encoded residual portion of the second block,
identifying a first transform setting for applying the first inverse transform process to the first encoded residual portion of the first block based on a first syntax element set signaled in association with the first color space component,
identifying a second transform setting for applying the first inverse transform process to the second encoded residual portion of the second block based on a second syntax element set signaled in association with the second color space component,
applying the first inverse transform process to the first encoded residual portion to generate the first transformed block based on the identified first transform setting, and
applying the first inverse transform process to the second encoded residual portion to generate the second transformed block based on the identified second transform setting;
apply a second inverse transform process to the first transformed block and the second transformed block to generate the first residual portion and the second residual portion for output, respectively;
determine whether a third transform setting for applying the first inverse transform process to a third encoded residual portion of the third block is to be signaled in association with the third color space component or the second color space component;
when the third transform setting is determined to be signaled in association with the third color space component, identify the third transform setting based on a third syntax element set signaled in association with the third color space component; and
when the third transform setting is determined to be signaled in association with the second color space component, use the second transform setting as the third transform setting, without identifying the third transform setting based on the third syntax element set.

11. The video decoding device according to claim 10, wherein
the identified first transform setting includes information indicating first candidate transform matrices, or a selected first transform matrix, for the first inverse transform process used to generate the first transformed block, and
the identified second transform setting includes information indicating second candidate transform matrices, or a selected second transform matrix, for the first inverse transform process used to generate the second transformed block.

12. The video decoding device according to claim 10, wherein the processing circuit is further configured to extract a flag from the encoded video data, the flag indicating whether the third transform setting is to be signaled in association with the third color space component or the second color space component.

13. The video decoding device according to claim 12, wherein the processing circuit is further configured to extract the flag from video level, picture level, slice level, tile level, or sequence level syntax elements.

14. The video decoding device according to claim 10, wherein the processing circuit is further configured to derive whether the third transform setting is to be signaled in association with the third color space component or the second color space component.

15. The video decoding device according to claim 14, wherein the processing circuit is further configured to:
determine that the third transform setting is to be signaled in association with the second color space component when block partitioning structures corresponding to the second color space component and the third color space component are the same; and
determine that the third transform setting is to be signaled in association with the third color space component when the block partitioning structures corresponding to the second color space component and the third color space component are the different.

16. The video decoding device according to claim 10, wherein the first color space component corresponds to a luma component, and the second color space component corresponds to a chroma component.

17. The video decoding device according to claim 10, wherein the second color space component corresponds to a first chroma component, and the third color space component corresponds to a second chroma component.

18. A video decoding method, comprising:
receiving encoded video data associated with a first block, a second block, and a third block of an image frame, wherein the first block corresponds to a first color space component of a color space, the second block corresponds to a second color space component of the color space, and the third block corresponds to a third color space component of the color space;
obtaining a first transformed block of a first residual portion of the first block and a second transformed block of a second residual portion of the second block from the encoded video data, including
when a first inverse transform process is to be applied to a first encoded residual portion of the first block and a second encoded residual portion of the second block,
identifying a first transform setting for applying the first inverse transform process to the first encoded residual portion of the first block based on a first syntax element set signaled in association with the first color space component,
identifying a second transform setting for applying the first inverse transform process to the second encoded residual portion of the second block based on a second syntax element set signaled in association with the second color space component;
applying the first inverse transform process to the first encoded residual portion to generate the first transformed block based on the identified first transform setting, and
applying the first inverse transform process to the second encoded residual portion to generate the second transformed block based on the identified second transform setting;
applying a second inverse transform process to the first transformed block and the second transformed block to generate the first residual portion and the second residual portion, respectively;
determining whether a third transform setting for applying the first inverse transform process to a third encoded residual portion of the third block is to be signaled in association with the third color space component or the second color space component;
when the third transform setting is determined to be signaled in association with the third color space component, identifying the third transform setting based on a third syntax element set signaled in association with the third color space component; and
when the third transform setting is determined to be signaled in association with the second color space component, using the second transform setting as the third transform setting, without identifying the third transform setting based on the third syntax element set.

* * * * *